UNITED STATES PATENT OFFICE.

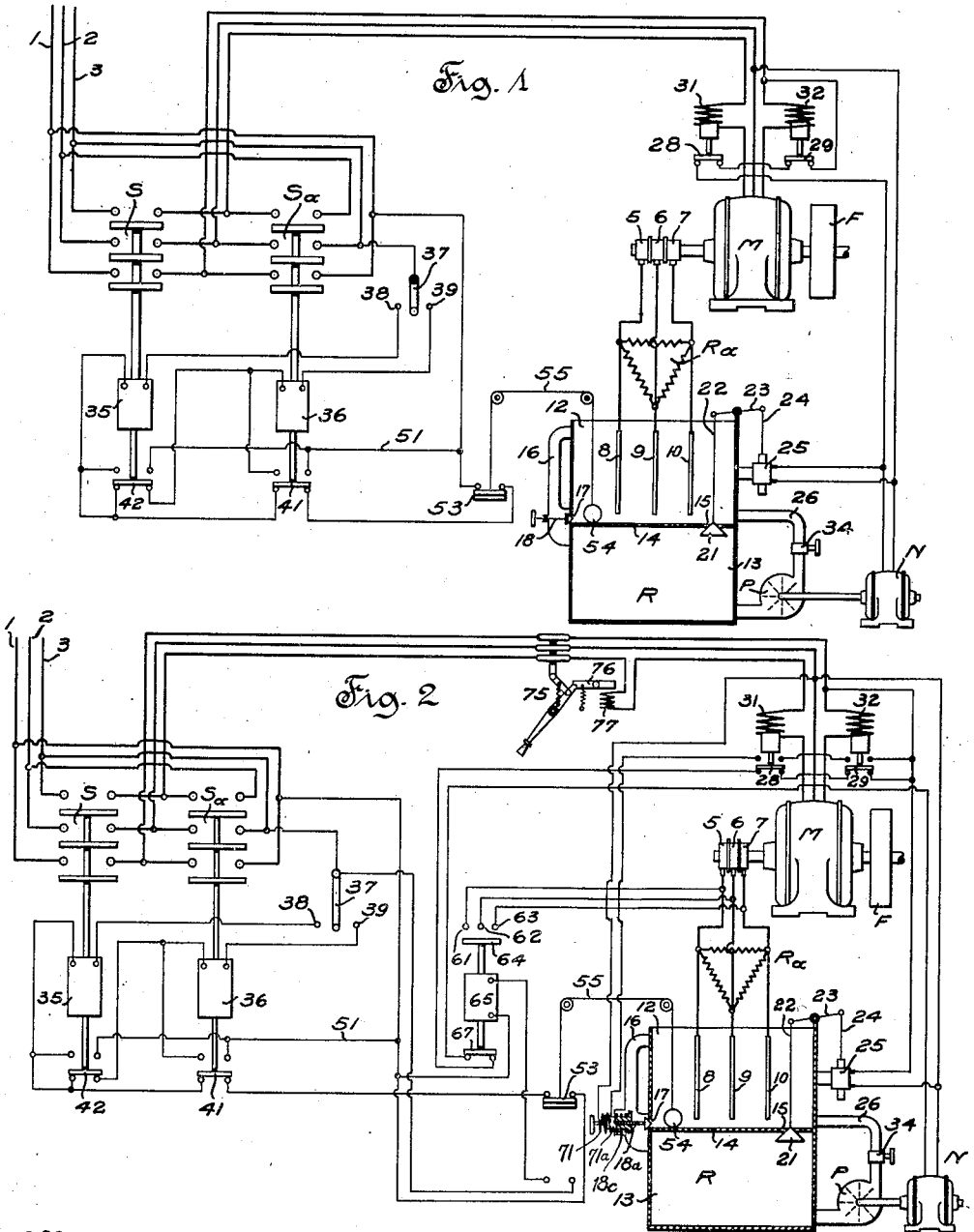

HALFDAN A. STEEN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

MOTOR-CONTROL SYSTEM 1,284,487.     Specification of Letters Patent.     Patented Nov. 12, 1918.

Application filed July 25, 1914. Serial No. 853,164.

*To all whom it may concern:*

Be it known that I, HALFDAN A. STEEN, a subject of the King of Norway, residing at Milwaukee, in the county of Milwaukee and State of Wisconsin, have invented a certain new and useful Improvement in Motor-Control Systems, of which the following is a specification.

This invention relates in general to control devices and has particular reference to devices for automatically controlling electric motors.

In the control of electric motors best suited for certain classes of work, it is sometimes desirable to vary the resistance of one or more of the motor circuits as the load on the motor varies. An instance of the use of a control system of this character is in connection with induction motors such as are used for driving a variable load, where a fly wheel is operative, when the load on the motor is below a predetermined value, to absorb the energy not required for driving the load, and where portions of the system are operative, when the load on the motor exceeds the predetermined value, to cause a slowing down of the motor for the purpose of enabling the fly wheel to give up its stored energy.

It is an object of this invention to provide improved apparatus for controlling electric motors, which apparatus is comparatively simple in design and efficient in operation.

It is a further object of this invention to provide an improved system of control whereby an electric motor is automatically controlled in response to changes in the load on the motor.

It is a further object of this invention to provide improved motor controlling apparatus, comprising a variable resistance device of improved design.

It is a further object of this invention to provide an improved system of control for an induction motor driving a variable load, whereby the speed of the motor is automatically controlled as the load thereon varies.

These and other objects are attained by this invention, the various novel features of which will appear from the description and drawings, disclosing one embodiment of such invention, and will be particularly pointed out in the claims.

In the accompanying drawings:

Figure 1 is a diagrammatic view showing the elements of a control system for electric motors, embodying features of this invention.

Fig. 2 is a diagrammatic view of a control system for electric motors, such system being a modification of that shown in Fig. 1.

In accordance with Fig. 1 of the drawings, a motor M, shown as being of the induction type and having a fly-wheel F mounted on its shaft, is supplied with energy from a polyphase line 1, 2, 3, switches S and $S_a$ being inserted between the motor and the supply line for enabling the operation of the motor in one or the other direction, the switch S being capable of connecting the motor directly to the line for operation in one direction, and the switch $S_a$ being capable of connecting the motor to the supply line with the terminals of one of the phases reversed, so as to provide for operation of the motor in the opposite direction.

The secondary winding of the induction motor is connected to slip rings 5, 6, 7, on the motor shaft. These slip rings are in turn connected to electrodes 8, 9, 10, of the resistance device R. The resistance device R, in the form shown, comprises a receptacle or tank divided into upper and lower compartments, 12 and 13, respectively, by a horizontal partition 14; although, it will be obvious that a plurality of separate tanks, one disposed above the other, may be used instead of the form of device shown. An opening 15 in the partition 14 allows communication between the compartments 12 and 13. In the normal operation of the device, the upper compartment 12 is adapted to contain liquid resistance material to a greater or less degree, to provide for the immersion of the electrodes 8, 9, 10. A passage 16 between the upper portion of the upper compartment 12 and the lower compartment 13 serves as an over-flow, thus regulating the normal level of resistance material in the upper compartment. Another means of communication between the upper and lower compartments is furnished by an opening 17 in a wall of the upper compartment, communication being direct between the upper and lower compartments or, as shown, through the intermediary of the over-flow passage 16. An adjustable valve or gate 18, preferably capable of adjustment from the outside of the receptacle, serves to regulate the effective size of the opening 17. A valve 21, operated through a rod 22 and a lever 23, pivoted adjacent the upper edge of the upper compartment, serves to close the opening 15 in the partition 14. A rod 24, preferably actuated by an electro-magnet 25, may be used for operating the valve 21, through the lever 23 and the rod 22.

A pump P, driven by a motor N, serves to convey electrolyte from the lower compartment 13 to the upper compartment 12, through a communicating passage 26. The circuit of the motor N, along with that of the magnet 25, is shown as being supplied from one phase of the circuit supplying the main motor M. This circuit of the motor N and magnet 25 is normally closed through the switches 28 and 29, which are capable of being operated to open position by the series magnets 31 and 32, respectively, when the current in the motor circuit reaches a predetermined value. The passage 26 from the pump P to upper compartment 12 may be provided with an adjustable gate or valve 34 which may serve, either alone or in conjunction with the valve or gate 18, to regulate the rate of flow of electrolyte into the compartment 12.

A resistance $R_s$ is connected across the leads associated with the slip rings 5, 6, 7, in shunt to the electrodes 8, 9, 10. This resistance is permanently connected in circuit with the secondary of the motor, the circuit established between the electrodes 8, 9, 10, and the electrolyte in the upper compartment 12 serving as a shunt about the resistance $R_s$.

Electro-magnets 35, 36, serve to operate the switches S and $S_a$, respectively. The operating circuits of these magnets are shown as connected across one phase of the supply line, and a switch 37, adapted to engage with the contacts 38, 39, serves to close one or the other of these operating circuits. The circuit of the magnet 35 is normally completed through the switch 41, which is so associated with the operating means of the switch $S_a$, actuated by the magnet 36, as to be actuated when such switch $S_a$ is actuated. The circuit of the magnet 36 is normally completed through the switch 42, which is so associated with the operating means of the switch S, actuated by the magnet 35, as to be actuated when such switch S is actuated. When the magnet 35 is energized, the switch 42 is moved to an upper position in which it establishes a bridge or holding circuit for such magnet, through a connection 51 and independent of the switch 41. When the magnet 36 is energized, the switch 41 is moved to an upper position in which it establishes a bridging circuit for this magnet, through connection 51 and independent of the switch 42.

A switch 53 serves to complete the initial operating circuit of both of the magnets 35, 36. In the inoperative condition of the motor M, this switch 53 is closed. Operating means for this switch comprise a member 54, adapted to float on the surface of the electrolyte in the upper compartment 12, and a flexible connection 55 between the float member 54 and the switch.

As shown in Fig. 1, the circuit of the motor M is open. To start the motor, say in the direction provided for by the closure of switch S, the master switch 37 is moved so as to engage the contact 38, thus establishing the operating circuit of the magnet 35, through switches 41 and 53. The switch S is operated to closed position and the switch 42 is moved to its upper position, forming a short-circuiting bridge, through the connection 51, about the switches 41 and 53. It will be obvious that, on the completion of the motor circuit by the switch S, the magnet 25 is energized, actuating the gate or valve 21 to close the opening 15, and the circuit of the motor N is closed, causing the pump P to supply electrolyte to the upper compartment. As the secondary circuit of the motor M is always closed through the resistance $R_s$, the motor starts slowly, its speed gradually increasing and the resistance of its secondray circuit gradually decreasing due to the influx of electrolyte from the lower tank, which gradually immerses the electrodes 8, 9, 10. The level of the electrolyte in the upper compartment rises until it reaches the inlet to the overflow 16, at which time the secondary of the motor is practically short circuited.

Prior to starting the motor M, the valve 34 should be adjusted for the desired flow of electrolyte from the pump P to the compartment 12, and the valve 18 should be so adjusted as to permit such leakage from the upper tank, as allows the motor to accelerate at the proper rate.

As the load on the motor increases beyond a predetermined value, the switches 28, 29, are actuated by their operating magnets 31, 32, to open the operating circuits of the motor N and the electromagnet 25, causing the stoppage of the pump P and the opening of the valve 21. This action immediately causes an increase in the resistance of the secondary circuit of the motor M, with the consequent slowing down thereof, thus permitting the fly wheel F, mounted on the shaft of the motor, to slow down and give up a portion of its energy to the motor shaft. When the load drops to a normal value, the switches 28 and 29 close, energizing the magnet 25 to close the valve 21, and completing the circuit of the pump motor N. It will be obvious that the magnets 31, 32 will continue to regulate as the load on the motor changes.

As the level of the electrolyte in the upper compartment 12 rises, as during the motor-starting operation, the float 54 rises, permitting the switch 53 to open. The opening of this switch 53 breaks the initial operating circuit of the magnets 35 and 36, this action preventing the starting of the motor M in either direction, unless the resistance of the secondary circuit of the motor is a maximum, or that value corresponding to an absence of electrolyte from the upper compartment. It will be obvious that this provision prevents the starting of the motor when there might be such heavy currents in the motor secondary as would injure the windings.

To stop the motor M, the switch 37 is moved back to neutral position, thus breaking the circuit of the magnet 35 and permitting the switch S to open. This interruption of the circuit by the switch S will cause the breaking of the circuit of the pump motor N and the magnet 25. To cause the motor to operate in a reverse direction, the switch 37 is moved into engagement with the contact 39, thus completing the circuit of the operating magnet 36, which actuates the Switch $S_a$ to closed position and moves the switch 41 to its upper position, where it establishes a holding bridge for the magnet 36, through the connection 51, independent of the switches 42 and 53. The regulation of the motor, when operating in this direction, is accomplished by the magnets 31 and 32 in the same manner as when the switch S was closed.

In the system disclosed in Fig. 2, contacts 61, 62, 63 are connected to the slip rings 5, 6, 7 of the motor M, in shunt to the resistance $R_a$ and the electrodes 8, 9, 10. A switch 64, actuated by a magnet 65, the circuit of which is closed when the electrolyte in the upper compartment 12 is at its upper level, effects the bridging of contacts 61, 62, 63. This switch forms a means for closing the secondary circuit of the motor, independently of the fixed resistance, $R_a$ and the electrolyte in the compartment 12. The switch 53, which is actuated in response to changes in the level of the electrolyte in the compartment 12, serves, in its lower position, to close the circuit of the magnet 65, such circuit being, as shown, an independent one across the same phase of the supply line as the operating circuit of the magnets 35 and 36. A switch 67, connected for actuation with the switch 64, by the magnet 65, is actuated, when the switch 64 is actuated to closed position, to open the supply circuit of the pump motor N.

The valve $18_a$ which affords communication between the upper compartment and the lower compartment may be provided with an electromagnet 71 for accomplishing the opening of the valve. This electromagnet includes a core $71_a$ through which the stem of the valve $18_a$ is adjustably threaded, the core being normally urged by a spring $18_c$, bearing on a projection on the core and the inner wall of the overflow passage 16, in such direction as to tend to seat the valve in the opening 17. It is preferable that the valve $18_a$ remain closed, or in the position to which it is urged by the spring $18_c$, until the load on the motor M reaches a certain predetermined value, the regulating valve 34 in the passage 26 serving to adjust the rate of flow of electrolyte into the upper tank to regulate the rate of acceleration of the motor. The energizing circuit of the magnet 71 is completed by the switches 28, 29, operated by the solenoids 31 and 32, when the load on the motor reaches a predetermined value. The degree of opening of the valve $18_a$, on the energization of the magnet 71, may be regulated by adjusting the position of the valve stem relatively to the core $71_a$. This adjustment has the effect of varying the initial position of the core $71_a$ and the amount of travel of the same and of the valve carried thereby, on energization of the electromagnet.

The switches 28 and 29 serve the double purpose of closing the circuit of the valve operating magnet 71 and interrupting the circuit of the pump motor, although this latter action is effective for the purpose only during acceleration of the motor, that is, while the switch 67 is in its lower position. As shown, the magnet 25 is connected to the supply through a circuit independent of the pump motor circuit, this magnet being energized and deënergized only on the closure and opening of the main motor circuit, respectively.

A circuit breaker 75 may be provided in the supply circuit of the motor M. This circuit breaker is normally held in closed position by a latch 76 which is adapted to be tripped by an overload coil 77 on the occurrence of an overload of a predetermined degree, to permit the opening of the primary circuit of the motor by the circuit breaker.

With the parts as shown in Fig. 2, the motor M is at rest. To start the motor, the master switch 37 is moved into engagement with the contact 38, establishing the circuit of the operating magnet 35 through switches 41 and 53. The magnet 35 operates the switch S to closed position and moves the switch 42 to its upper position, establishing a holding circuit through the connection 51, independent of the switches 41 and 53.

On the closure of the switch S, the motor M starts, its secondary circuit being closed through the permanent resistance $R_a$, the pump motor N starts, and the magnet 25 is energized to cause the closing of the valve 21. The valve 34, having been properly adjusted, regulates the degree of acceleration of the motor M by permitting electrolyte to enter the upper compartment at the proper rate. The motor M speeds up as electrolyte is admitted to the upper compartment, reducing the resistance of the secondary circuit, so that by the time the motor is up to speed, the level of the electrolyte is approximately at the inlet of the overflow 16. As the level of the electrolyte rises in the compartment 12, the float 54 is carried upward, permitting the switch 53 to open; and, when the float is at a level corresponding to the inlet to the overflow 16, the switch 53 is in its lower position in which it completes the circuit of the magnet 65. Energization of this magnet causes the actuation of the switch 64 to bridge the contacts 61, 62, 63, establishing a short circuit for the motor secondary, independent of the resistance $R_a$ or the electrolyte in the compartment 12. Actuation of the switch 64 causes actuation of the switch 67 to open the circuit of the pump motor N.

The parts remain in this condition while the motor continues to operate at normal speed or there is a normal load on the motor. As the load on the motor increases beyond this normal value, the magnets 31 and 32 cause the actuation of the switches 28 and 29 to open the circuit of the motor N and to close the operating circuit of the magnet 71, causing the opening of the valve $18_a$ to permit flow of electrolyte from the upper compartment 12. As the level of electrolyte in this compartment falls, the circuit of the magnet 65 is opened by the switch 53, permitting opening of the switch 64 and the closing of the switch 67. It will be apparent that the circuit of the magnet 71 will remain closed while the load on the motor is above normal, thus permitting an increase in the secondary resistance by leakage from the upper compartment through the valve $18_a$, while the overload continues. When the load drops, the switches 28 and 29 drop to their lower positions and the valve $18_a$ is permitted to close, and the pump motor circuit is closed, the switch 67 being in its lower position. Electrolyte is now pumped to the upper compartment until it reaches its upper level, or until the load on the motor M again increases beyond normal value, in which case the operation previously described is repeated.

It will be apparent that, in the system disclosed in Fig. 2, the switches 28 and 29 are effective to control the circuit of the pump motor only while the main motor M is accelerating, either from rest, as during the starting operation, or from a low speed which results on the occurrence of an overload, since, at other times, the switch 67 is open, rendering control by the switches 28, 29 ineffective.

While it might be possible to avoid the use of the auxiliary resistance $R_a$, nevertheless, such a resistance is of great utility. As this forms the sole resistance in the secondary circuit when the primary circuit of the motor is closed, it will be obvious that the starting current is always the same. Again, where the resistance afforded by the electrolyte, forced into the upper compartment 12 by the pump, is depended upon alone to establish a starting resistance, it will be apparent that the motion of the electrolyte about the ends of the electrodes 8, 9, 10, causes a varying resistance and there may be unsatisfactory sparking at these points; and further, the percentage of salt in the electrolyte solution may cause considerable difference in the starting resistance. With the present arrangement, when the water reaches the electrodes 8, 9, 10, no arcing takes place for the reason that the circuit is already closed through the resistance $R_a$. By using this auxiliary resistance, the size of the liquid resistance device R may be considerably decreased, as a part of the energy lost in starting and regulating the motor is absorbed in this permanent resistance.

While the pump motor N is shown as being connected across a single phase of the supply line, it will be obvious that this motor may be of the polyphase type, or may be a motor of the direct curent type.

It will be obvious that the system shown in either Fig. 1 or Fig. 2 might be modified to the extent that, on the occurrence of an overload of a predetermined degree, the circuit of the magnet 25 alone would be interrupted, causing the valve 21 to be operated to open position, the pump motor N being permitted to operate. In this latter case, the valve 21 should be of such size as will effect the desired deceleration of the motor M, even though the pump is supplying electrolyte to the upper compartment.

It should be understood that it is not desired to be limited to the exact details of construction shown and described, for obvious modifications will occur to a person skilled in the art.

It is claimed and desired to secure by Letters Patent:

1. In a motor control system, a motor, switch means for completing the motor circuit, a liquid rheostat in the circuit of the motor, said rheostat comprising a receptacle adapted to contain electrolyte, electrodes immersible in electrolyte in said receptacle to vary the resistance of said motor circuit, and means comprising a controlling float operative in said receptacle for preventing the operation of said switch means to start said motor unless the resistance of said circuit is at a maximum value.

2. In a motor control system, a motor, a variable resistance in the circuit of said motor embodying a liquid rheostat comprising a receptacle adapted to contain liquid resistance material, electrodes immersible in said receptacle, means for furnishing liquid resistance material to said receptacle, means for regulating the rate of immersion of said electrodes and the rate of discharge of said resistance material from said receptacle when said electrodes are fully immersed, and means responsive to a predetermined load on the motor for causing a variation in the amount of resistance material in said receptacle.

3. In a motor control system, a motor, a variable resistance in the circuit of the motor comprising a liquid rheostat embodying a plurality of compartments, electrodes immersible in electrolyte in one of said compartments, means for circulating electrolyte from another of said compartments to the first compartment, and means operative to cause the discharge of electrolyte from the electrode-containing compartment to the other compartment at a rate greater than normal when the load on said motor is above a predetermined value until the load becomes normal again.

4. In a motor control system, a motor, a variable resistance in the circuit of said motor comprising a liquid rheostat embodying a plurality of compartments, electrodes immersible in electrolyte in one of said compartments, means effective to supply electrolyte from another of said compartments to the first compartment and permitting the discharge of electrolyte from said latter compartment at a predetermined rate, and means operative to cause the discharge of electrolyte from the electrode - containing compartment to the other compartment at a rate greater than normal when the load on said motor is above a predetermined value and to restore the normal rate of supply and discharge when the motor load becomes normal again.

5. In a motor control system, a motor, a variable resistance in the circuit of the motor, means rendered operative on the completion of the motor circuit for varying the resistance thereof, means rendered operative on the insertion of a predetermined amount of resistance for short circuiting said variable resistance, and load responsive means for accomplishing the removal of said short circuit and the variation of said resistance.

6. In a motor control system, a motor, a fly wheel associated therewith, a variable resistance in the circuit of said motor comprising a liquid rheostat embodying a receptacle adapted to contain electrolyte and electrodes immersible in the electrolyte in said receptacle, means for supplying electrolyte to said receptacle for causing variation of the degree of immersion of said electrodes, and means responsive to the load on said motor for affecting the operation of said latter means to cause slowing down of said motor as the load increases beyond a predetermined value to permit the fly wheel to give up a portion of its energy.

7. In a motor control system, a motor, a fly wheel associated therewith, a variable resistance device in the circuit of said motor and comprising a liquid rheostat embodying a receptacle adapted to contain electrolyte and electrodes immersible therein, means for forcing electrolyte into said electrode-containing receptacle, means for permitting the discharge of electrolyte from said receptacle and means responsive to an excessive load on said motor for controlling said discharge-permitting means to thereby cause slowing down of said motor through a decrease in the amount of electrolyte in said receptacle.

8. In a motor control system, a motor, a liquid rheostat in the circuit of said motor comprising a receptacle adapted to contain electrolyte, electrodes immersible in electrolyte in said receptacle, means operative on the closure of the motor circuit for permitting the immersion of said electrodes, means for accomplishing the immersion of said electrodes comprising a pump for furnishing electrolyte to said receptacle and a valve that is normally, at least partially, closed, means responsive to the amount of electrolyte in said receptacle for rendering said pump inoperative, and means responsive to the load on said motor for actuating said valve to permit an increased discharge of electrolyte from said receptacle.

9. In a motor control system, an induction motor, and a combined starting and slip-regulating rheostat in the secondary circuit of said motor, said rheostat comprising a receptacle, electrodes in said receptacle, means for supplying liquid resistance material to said receptacle for varying the degree of immersion of said electrodes, means for permitting the discharge of liquid resistance material from said receptacle, and means operative in response to a predetermined load on said motor for effecting the operation of one or the other of said supplying means and said discharge-permitting means to decrease the degree of immersion of said electrodes.

10. In a motor control system, an induction motor, and a combined starting and slip-regulating rheostat in the secondary circuit of said motor, said rheostat comprising a receptacle, electrodes in said receptacle, a pump for supplying liquid resistance material to said receptacle for varying the degree of immersion of said electrodes, and means operative in response to a predetermined load on said motor for regulating the operation of said pump.

In testimony whereof, the signature of the inventor is affixed hereto in the presence of two witnesses.

HALFDAN A. STEEN.

Witnesses:
W. H. LIEBER,
J. J. KANE.